United States Patent [19]

Peabody, Jr.

[11] 4,179,903

[45] Dec. 25, 1979

[54] PREPARING INSULATED WIRE FOR CUTTING AND STRIPPING

[75] Inventor: Frederick H. Peabody, Jr., Newville, Pa.

[73] Assignee: General Signal Corporation, Stamford, Conn.

[21] Appl. No.: 863,278

[22] Filed: Dec. 22, 1977

[51] Int. Cl.² ............................................. F25B 25/00
[52] U.S. Cl. .......................................... 62/322; 62/375
[58] Field of Search ..................... 62/63, 64, 373, 374, 62/375, 376, 320, 322; 241/17, 23; 34/242

[56] References Cited

U.S. PATENT DOCUMENTS

| 2,165,056 | 7/1939 | Kalischer | 62/63 |
|---|---|---|---|
| 2,287,825 | 6/1942 | Postlewaite | 62/63 |
| 2,952,240 | 9/1960 | Abbott | 34/242 |
| 3,360,428 | 12/1967 | Loynd | 34/242 |
| 3,527,414 | 9/1970 | Schorsch | 241/23 |
| 3,722,077 | 3/1973 | Armstrong | 62/374 |
| 4,000,625 | 1/1977 | Beerens et al. | 62/63 |
| 4,040,269 | 8/1977 | Nordblad et al. | 62/374 |

*Primary Examiner*—Ronald C. Capossela

[57] ABSTRACT

Insulated wire which is to have a portion of the insulation cut and stripped therefrom is passed through an elongated cooling chamber to cool the insulation below a threshold temperature which enables the insulation to be cut and stripped with improved accuracy and less residual deformation. The cooling chamber may comprise a pipe having its central portion immersed in a refrigerant. The entrance and exit ports of the cooling chamber may be equipped with replaceable end caps sized to accommodate the wire being processed and to restrict the entry of moisture laden air.

12 Claims, 4 Drawing Figures

PREPARING INSULATED WIRE FOR CUTTING AND STRIPPING

BACKGROUND OF THE INVENTION

Insulation is used on wire for a wide variety of purposes, including protecting the wire from inadvertent or accidental contact with other conductors. The type of insulation which is used will depend upon a wide variety of factors including: economy, ambient temperature, desired flexibility, space limitations, the environment, the applied potential, atmospheric conditions, ambient contaminants, and a wide variety of other conditions with which those familiar with the art are acquainted. It is not unusual to provide an insulation which is a combination of a variety of insulators. For example, there may be an initial insulation of some type of fiber covered by either a plastic or rubber. Sometimes, the outer insulation includes a braided metllic sheath or flexible metal conduit. Some of the more common insulating materials include: woven fiber such as cotton, linen, nylon or hemp; rubber or any of the plastics having similar or improved characteristics for the application under consideration; and a variety of other substances and/or combinations as currently used in the industry.

In order to make electrical connection to the insulated wire, it is necessary to strip or remove a portion of the insulation near the end of the wire in order to expose the bare wire for making a connection thereto by any of a wide variety of methods including: soldering connections, crimping terminals, welding, compression under a screw or other device, and any of a variety of other techniques with which those familiar with the art are aware.

Removing the insulation to prepare the wire for electrical connection may be done by any of a wide variety of means including manual and automatic. The techniques disclosed herein relate to automatic removal of insulation and, more particularly, but not exclusively, to the removal of insulation from relatively small wire such as size 16 down to wire sizes in the 20's and smaller.

There are two common methods which are customarily used in automated procedures for removing a predetermined length of insulation from an end of a wire. One method requires the cutting of the insulation and the stripping thereof from the wire. The other method employs the application of heat to cut, burn or melt through the insulation and then the stripping of the severed insulation from the wire. As a general rule, the cutting procedures are faster than the thermal procedures.

Cutting the insulation and stripping it from the wire requires a very careful adjustment to avoid any possibility that the cutters may nick the wire. Nicking the wire is detrimental as it seriously weakens the wire and introduces the increased probability of the wire breaking. Accordingly, it is customary to adjust the cutters so that they do not quite cut through the entire insulation. The cuts may be through approximately 65 to 90 percent of the insulation thickness. Thereafter, the wire is gripped on both sides of the cut and the insulation at the free end is stripped off by an application of longitudinal force. The force must be sufficient to rupture the uncut portion of the insulation and to overcome the frictional force between the wire and the insulation. Depending upon the type of insulation material used, the rupturing of the uncut portion may result in a necking down of the insulation rather than leaving a square shoulder. In certain applications, a square shoulder is highly desirable in order to help provide a shoulder stop as the wire is pushed through a hole, such as in a circuit board, for soldering. Also the necking down and/or the resultant stretching of the insulation results in an exposed length of wire of somewhat indeterminate and variable length.

The structure disclosed herein is designed to overcome the necking and other disadvantages of the prior art cutting and stripping techniques.

SUMMARY OF THE INVENTION

There is disclosed an apparatus for preparing an outer insulation which covers an electrically conductive wire so that at least a portion of the insulation may be conveniently, efficiently, and expeditiously cut and stripped from the wire. The insulation is conditioned by cooling it within a cooling chamber so that the insulation is cooled below a threshold temperature which alters the characteristics of the insulation so that there is a reduced tendency to deform. The cooling chamber has an entrance and exit port to facilitate the passage of the wire through the cooling chamber. Because of the reduced tendency of the insulation to deform, the insulation will show little, if any, tendency to neck at the point of rupture when the partially severed insulation portion is stripped from the wire.

It is an object of the present invention to prepare insulated wire for cutting and stripping.

It is a more specific object of the invention to condition wire insulation so that it may be cut and stripped more expeditiously.

It is an even more specific object to condition the insulation so that it may be cut and stripped by an automatic cutting and stripping machine and leave a square shoulder; or in other words, cut and strip the insulation without any necking of the insulation.

It is an object of the invention to condition conditionable insulating material by cooling the insulation below a threshold value which renders the insulation more stiff and/or brittle.

It is another object of the invention to condition the insulation by passing the insulated wire through a cooling chamber just prior to the automatic cutting and stripping operation.

It is another object of the invention to minimize frosting within the cooling chamber by orienting the ports to minimize convention air currents.

It is another object of the invention to minimize frosting within the cooling chamber by restricting the entrance and/or exit ports to a size which complements the wire size being processed.

DESCRIPTION OF THE DRAWING

The invention, together with its advantages and objects, may be more fully comprehended by considering the following specification together with the drawing in which FIG. 1 comprises a block diagram of the invention.

DESCRIPTION OF THE PREFERRED EMBODIMENT

Figure 1:
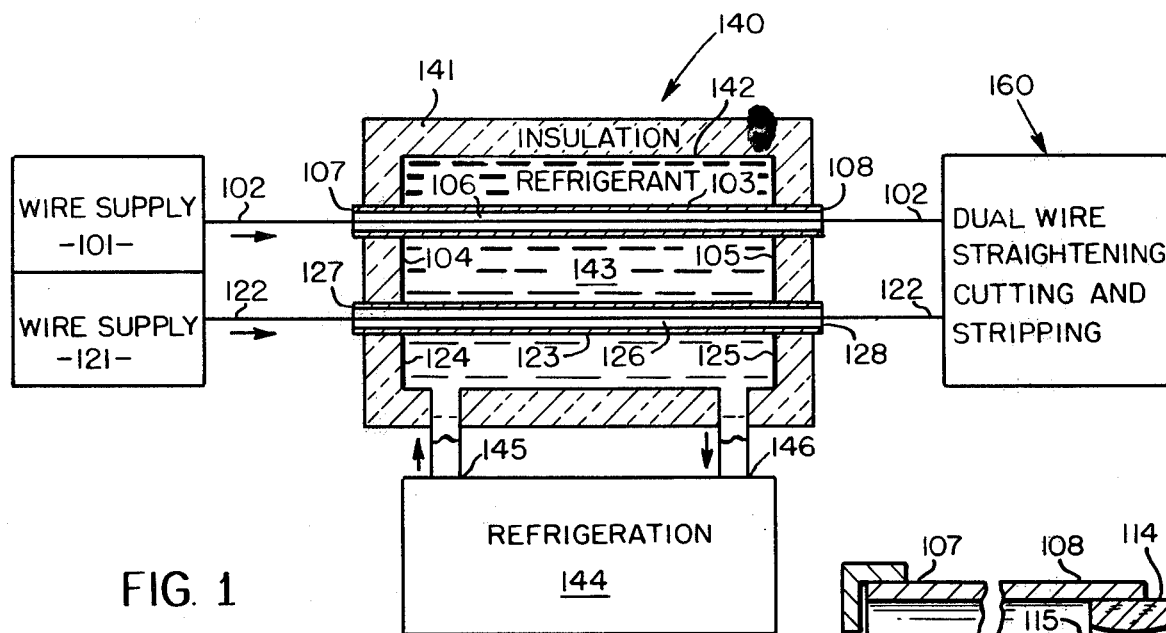

Considering now more specifically FIG. 1, there will be seen wire supplies 101 and 121 each of which represents a roll of insulated wire which is to be pulled off and cut into uniform pieces of predetermined length with the insulation stripped from one or both ends for a predetermined and controlled length. The wires 102 and 122 are pulled from wire supplies 101 and 121, respectively, and are fed through cooling tubes 103 and 123, respectively. The cooling tubes 103 and 123 pass through a housing indicated generally as 140 and comprising an outer insulating jacket 141, an inner chamber 142 which is liquid tight and through which a refrigerant 143 is circulated. The refrigerant 143 is circulated and cooled by refrigeration equipment 144. The refrigerant may be any commercial refrigerant such as the common nonflammable gaseous or liquid fluorocarbons, or cooled air, or water, or any other suitable substance. The wires 102 and 122 are pulled into the dual wire straightening, cutting and stripping machine 160 which may comprise any of a variety of commercially available cutters and strippers. The wire straightening, cutting and stripping machine 160 and its details of operation are well known to those familiar with the art and, therefore, is not shown in detail herein. While the invention is not limited to use with cutting and stripping machines which use blades, it is believed that the invention will find its greatest utility with such machines. However, the invention could be used with thermal cutters.

The drawing illustrates first and second wire supplies, dual cooling tubes 103 and 123, and a dual wire cutter and stripper 160. It should be understood that the invention could also be used with a single wire supply and a cutter and stripper which accommodates a single wire. Or, the apparatus could be easily modified to function with more than two wire supplies. It should be understood that the wire supply may be a single conductor which may be either solid or stranded; or coaxial; or a multiconductor.

The inner chamber 142 is a liquid tight container having an inlet port 145 and an outer port 146. The inner chamber 142 is sealed to the cooling tubes 103 and 123 at the walls 104, 105, 124, and 125. The cooling tubes 103 and 123 may preferably be made of a good heat conductor, such as copper, so that the cooling effect of the refrigerant 143 may be passed through the cooling tubes 103 and 123 to the interior 106 and 126, respectively. The cooling tubes 103 and 123 will preferably have a wall thickness which is sufficient for mechanical strength, but thin enough to allow the circulated refrigerant 143 to cool the interior 106 and 126 of the cooling tubes 103 and 123, respectively. The cooling tubes 103 and 123 will have an interior diameter which is ample to allow the free and unrestricted passage of the largest wire 102 or 122 which is to pass therethrough. A one quarter inch diameter is suitable for many applications. A one quarter inch cooling chamber has a cross-sectional area of about 0.05 square inches. A No. 20 wire with a 0.025 insulation has a cross-sectional area of approximately 0.005 square inches and, therefore, the cooling chamber has a cross-section approximately one order of magnitude greater than the wire. This allows ample room for the wire to be pulled through the chamber 103 without excess drag or friction. The interiors 106 and 126 of the cooling tubes 103 and 123 will be maintained at a lower temperature than the external air and, therefore, the wire 102 and 122 entering their respective cooling chambers will be cooled.

The temperature differential of the wire entering the cooling tube 103 at the left end 107 and the same wire leaving the cooling tube 103 at the right end 108 will depend upon a variety of factors which obviously include: the length of the cooling tube 103 from end 107 to end 108; the temperature gradient between the external air and the interior 106 of the cooling tube 103; and the rate of travel of the wire 102. The rate of travel of the wire 102 will depend upon the wire cutting and stripping machine 160 and usually it will also be a function of the length to which the wire is being cut. That is, the wire cutter 160 pulls the wire 102 at a relatively uniform velocity and then stops it during the cutting and stripping operation. Accordingly, the time duration of a given increment of the wire 102 in the cooling chamber 103 will be shorter when the wire is being cut into long lengths as there are fewer stop and cut periods; whereas when the wire is being cut into short pieces, there are numerous stop and cut periods and the time in the cooling tube 103 is increased. Accordingly, if it is desired to have the wire 102 at or below a predetermined threshold temperature as it enters the cutter and stripper 160, it will be necessary to design a housing 140 which has cooling tubes 103 and 123 of appropriate length and/or to provide refrigeration equipment 144 with the necessary cooling capacity. In practice, it has been found that for a normal range of cut lengths a cooling tube having a length of the order of three feet is adequate when combined with refrigeration equipment 144 of the same capacity as used in a conventional water cooler or smaller household refrigerator. In cases where the length of the cooling chamber must be restricted, it would be possible to increase the cooling effect on the wire by forming the cooling chamber in an arc or a series of undulations. This would increase the direct contact of the wire within the cooling chamber to improve heat transfer, but it would also increase the frictional drag.

The advantages of cooling the wire prior to entry into the cutting and stripping machine 160 will be explained more fully hereinbelow. However, for the present, it should be understood that the wire temperature, as it enters the cutting and stripping machine, is not usually critical and may be of the order of twenty or forty degrees Farhenheit or minus seven to plus five celsius. The temperature range may vary for various insulation materials, and other temperature ranges may be used.

Figure 4:
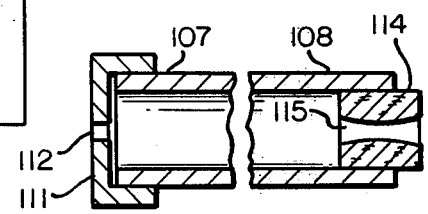
FIG. 4 illustrates port restriction means.

If the ambient air outside the cooling chamber 103 is moisture laden, there may be a tendency for frost to form in the interior 106. Various techniques may be used to minimize frosting. One simple technique is to orient the cooling tube 103 horizontally to reduce the circulation of air by the well known chimney effect. The cooling chamber could also be slightly bowed with the entrance and exit ports above the central part of the bow. This would assist in the reduction of natural convection of air. In addition, an end restriction member such as the cap 111 or the plug 114 shown in FIG. 4 could be used. The cap 111 or plug 114 would include a port 112 or 115, respectively, for the entrance and exit of the wire 102. The ports 112 and/or 115 could be sized to complement the wire being processed. The port 115 could be shaped, as illustrated, to minimize frictional drag.

If conditions required, heating wires could be placed inside the cooling tube to periodically melt any formed frost. In such case, provision would be made to drain the water and to halt the passage of wire.

It will be understood that the refrigeration equipment 144 includes the conventional pump, condenser and associated equipment. The insulation 141 is provided to improve refrigeration efficiency.

In the preceding description, references have been made to cooling tube 103. It should be understood that the comments with respect thereto apply equally to cooling tube 123.

Figure 2:
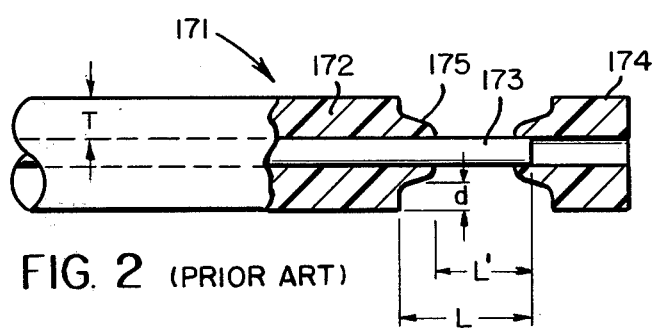
FIG. 2 shows an enlarged view of the end of a wire from which insulation has been cut and stripped by prior art techniques.

Considering now more specifically FIG. 2, there will be seen a considerably enlarged view of a wire 171 having insulating material 172 around an electrical conductor 173 which may comprise solid or stranded conductors. In a typical prior art method of cutting and stripping the wire 171, the insulation 172 might be cut to a depth of approximately 60 to 85 percent of the wall thickness of the insulating material 172. This is illustrated as depth "d" in FIG. 2 out of a total thickness "T". After cutting to the depth "d", the portion 174 of the insulation to be stripped from the conductor 173, is gripped and longitudinal force applied. If the insulating material 172 is of any of a wide variety of plastic insulating material, the material will tend to deform before it ruptures, thereby leaving a shoulder having a generally S-shaped or curved appearance as illustrated at 175. In general, the thicker the insulating material, the greater the tendency to neck. The deformation of the insulation material 172 into the S-curve 175 results in an irregular shoulder and causes the exposed length of uninsulated conductor 173 to have a length "L'" instead of a length "L" wherein "L" starts at the point where the insulation 172 was cut, and "L'" starts at the end of the necking of the insulation 172. The difference between "L" and "L'" may vary from sample to sample depending upon the temperature at the time the cut was made and/or the depth "d" of the cut and other factors, including the composition of the insulating material 172.

In some applications, wire is stripped in order to allow the crimping of a terminal thereon. If the stripped wire is laid into the terminal and it is crimped, an unsatisfactory connection may be made if part of the shoulder 175 of the insulation material 173 lies within the crimp. If the stripping machine is set to strip a portion 174 of insulation 172 from the wire 171 such that the minimum length "L'" will assure that none of the necked shoulder 175 is placed in the crimping area, an unsatisfactory or unsightly finished product may result because of bare conductor 173 extending beyond the crimped area. In other applications, the stripped conductor 173 is inserted in a hole, as for example, in a printed circuit board, and solder applied on the other side of the board. If there has been insulation necking as at 175, a portion of the neck 175 may extend through the hole of the printed circuit board and an unsatisfactory solder connection made.

From the above, it will be seen that the necking of the insulation may cause unsatisfactory results.

Figure 3:
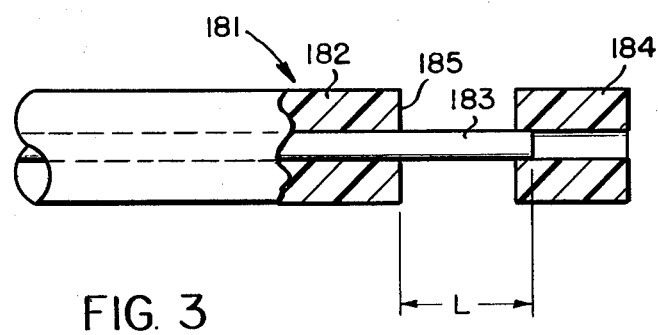
FIG. 3 illustrates an enlarged view of the end of a wire from which insulation has been cut and stripped by the techniques of the present invention.

Considering now more specifically FIG. 3, there will be seen a wire indicated generally as 181 having insulating material 182, a conductor 183, and a portion 184 of the insulating material 182 which is being stripped from the wire 181. Because the wire 181 was passed through the cooling chamber 103 of applicant's invention, the insulating material 182 had its temperature reduced below a threshold value before it entered the wire cutting and stripping machine 160. By this means, the insulating material 182 was rendered more rigid, brittle, or stiff and, therefore, when the cutting and stripping machine 160 cut the insulation 182 to the 65 to 85 percent depth of the thickness thereof, the insulating material, because of its changed characteristics, may have split to a greater depth. Accordingly, as a longitudinal force is applied to remove the portion 184, the insulation material 182 will fracture more readily and exhibit a nearly insignificant tendency to deform or neck, thereby resulting in a square shoulder 185 as illustrated in FIG. 3. Accordingly, it is easy to produce a cut and stripped wire 181 having an exposed conductor 183 of a closely controlled predetermined length "L" and with a square shoulder 185. It will be obvious that with the square shoulder 185, the difficulties mentioned with respect to the shoulder 175 are overcome.

The thickness "T" of the insulating material 172 or 182 and the length "L" will vary from one application to another. However, the problems described tend to be more severe with relatively small wire sizes, wherein the insulation thickness may be of the order of 0.040 inches plus or minus ten or fifteen thousandths and wherein a typical stripped length "L" may be of the order of 3/16 of an inch plus or minus a sixteenth. Working with wires of the type described, it is possible to produce cut and stripped ends with an exposed length "L" within very close limits.

It will be understood by those familiar with wire and the wide variety of insulation material 172 and 182 that the equipment described hereinabove will work only with those materials which exhibit different characteristics at different temperatures. However, this includes a wide range of the conventionally used plastic insulators and, therefore, when accurate cutting and stripping is desired, the engineer can invariably select a wire with insulation having a characteristic which render it ideally suited for use in the described apparatus. The threshold temperature to which the insulation material 182 must be cooled may vary from material to material. Experience has shown that with conventional insulation material, the temperature is not critical and that satisfactory results are obtained with temperatures approximating that of the freezing point of water. Achieving insulation temperature of this value may require a lower temperature in the interior 106 of the cooling chamber 103. Experience has also shown that sufficient cooling of the wire insulation may be obtained if the wire is in the cooling chamber for ten or twenty seconds.

While there has been shown and described what is considered at the present to be a preferred embodiment of the invention, modifications thereto will readily occur to those skilled in the related arts. For example, a plurality of wires could be run through a single cooling tube and/or the cooling tubes could be curved in order to increase the direct contact between the wire and the cooling tube. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. Apparatus for preparing an outer insulation covering on electrically conductive wire for removal of a selectively controlled portion of the insulation from the wire and comprising in combination:
   (a) a cooling chamber for cooling the outer insulation below a predetermined threshold temperature at which the responsiveness of the insulation to deformation from tensile stress is reduced;
   (b) an entrance port and an exit port of said cooling chamber for the entrance and exit, respectively, of insulated wire passed through said cooling chamber; and
   (c) cutting and stripping means near said exit port to which the insulated wire is fed for cutting and stripping a selectively controlled portion of the insulation from the wire, while the insulation is below said predetermined temperature, by a circumferential cut through a part of the insulation followed by the application of a tensile force whereby the insulation remaining on the wire is subjected to minimal deformation in the vicinity wherein the selectively controlled portion was separated from the remaining portion during the cutting and stripping.

2. The combination as set forth in claim 1, wherein said cooling chamber comprises an elongated passageway enclosed within a cooling medium.

3. The combination as set forth in claim 2, wherein said cooling medium is a refrigerant.

4. The combination as set forth in claim 1, wherein said entrance and exit ports are at respective ends of an elongated passageway.

5. The combination as set forth in claim 4, wherein said passageway between said entrance and exit ports is surrounded by a recirculated refrigerant.

6. The combination as set forth in claim 5, wherein said passageway comprises a tube of approximately uniform internal cross-sectional area.

7. The combination as set forth in claim 6, wherein said internal cross-sectional area is of the order of one order of magnitude greater than that of the insulated wire to be passed therethrough.

8. The combination as set forth in claim 7, wherein said passageway has a major portion which is straight.

9. The combination as set forth in claim 8, wherein said major portion is horizontal.

10. The combination as set forth in claim 1 and including an end restriction member having a port hole associated with at least one of said entrance and exit ports for, in effect, reducing the area of the associated port.

11. The combination as set forth in claim 10, wherein said end restriction member comprises a cap member which fits over the associated entrance or exit port.

12. The combination as set forth in claim 10, wherein said end restriction member comprises an insert member which is inserted into the associated entrance or exit port.

* * * * *